United States Patent [19]
Dennis

[11] 3,837,087
[45] Sept. 24, 1974

[54] WHEEL ALIGNMENT TOOL
[76] Inventor: Albert E. Dennis, Box 220A, McGee Circle, Denmark, S.C. 29042
[22] Filed: Dec. 10, 1969
[21] Appl. No.: 883,823

[52] U.S. Cl. .............................. 33/337, 33/203.18
[51] Int. Cl. ........................................ G01b 19/295
[58] Field of Search ..................... 33/203.18, 207 R

[56] References Cited
UNITED STATES PATENTS
3,250,015  5/1966  Piper ............................. 33/203.18
2,032,399  3/1936  Button ........................... 33/203.18
2,645,860  7/1953  Bender et al. ................. 33/203.18
2,958,952  11/1960 Bender ........................... 33/203.18

Primary Examiner—William D. Martin, Jr.
Attorney, Agent, or Firm—C. Gordon McBride

[57] ABSTRACT

A tubular member having a collar at one end for attachment to the spindle of a vehicle wheel and having a cross angle at the end opposite the collar. The tubular member and angle have a flat upper surface for receiving a conventional spirit level to determine camber and caster, respectively.

1 Claim, 3 Drawing Figures

PATENTED SEP 24 1974          3,837,087

WHEEL ALIGNMENT TOOL

This invention relates generally to the alignment of wheels on vehicles, and more particularly, to a wheel alignment device utilizing a spirit level for determining camber and caster.

Various devices, apparatus and systems have been used and are known in the prior art for determining the camber and caster of vehicle wheels. Caster is the backward tilt of the axle or the member holding the wheel and camber is the outward tilt of the top of the wheel. Caster and camber are utilized in order to provide for ease of steerage of the vehicle and produce a minimal amount of wear on the vehicle tires. The various systems and apparatus known in the prior art have generally been quite complicated, difficult of use, and generally expensive. Furthermore, the previously known devices were of questionable reliability except in the most expensive and sophisticated systems.

In order to overcome the disadvantages of the prior art the present invention contemplates the use of a simple, reliable mechanism that is inexpensive, easily installed and maintained and which utilizes a tube and angle with a collar at one end for attachment to the wheel spindle of the vehicle.

It is an object of this invention to provide a simple, effective and accurate wheel alignment device.

Another object of the instant invention is to provide a readily and easily attached and usable wheel alignment device capable of being attached to the wheel spindle.

Still another object of this invention is to provide a wheel alignment device that automatically is located on the wheel to provide for accurate alignment of the wheel with a minimum expenditure of time and effort.

A still further object of the instant invention is to provide a tubular member having a collar at one end for fitting over the wheel spindle and an angle at the opposite end such that a flat surface on the angle and on the tubular member are capable of receiving a spirit level for determining caster and camber to permit rapid and accurate alignment of a vehicle wheel.

Generally, the foregoing and other objects are accomplished by utilizing a tubular member having a flat upper surface and a collar on one end with an angular member attached at the end opposite from the collar in such a manner that one surface of the angle is perpendicular to the centerline of the tube and has a flat surface parallel to the flat surface on the tubular member.

A more complete appreciation of the invention and many of the attendant advantages thereof will be readily apparent as the same becomes better understood by reference to the following description when considered in connection with the accompanying drawings wherein.

Figure 1:
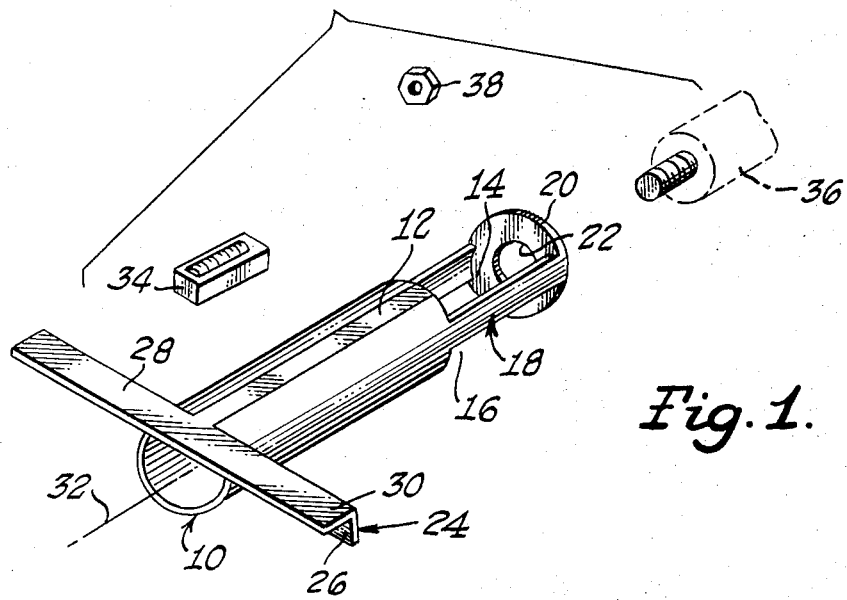
FIG. 1 is an isometric view of the instant invention in a partially exploded configuration.
Figure 3:
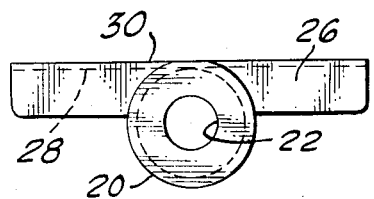
FIG. 3 is an end view of the instant invention.
Figure 2:
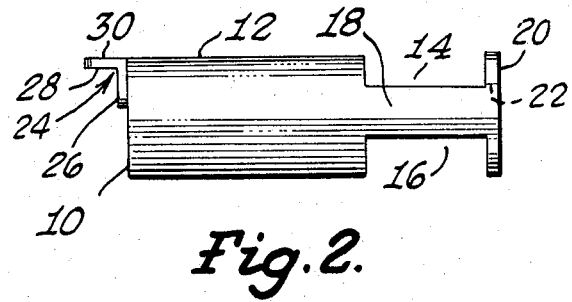
FIG. 2 is a side elevational view of the instant invention as it would be applied to its intended purpose.

Referring now to the drawings and more particularly to FIGS. 1–3 wherein the instant wheel alignment tool is shown to have body 10 generally of tubular or cylindrical configuration with flat surface 12 on the upper portion thereof. Openings 14 in the top and 16 in the bottom of body 10 form connecting arms 18 which extend from the substantially circular body portion 10 of the alignment tool. Washer shaped end collar 20 has central openings 22 and is attached or molded onto the end of arms 18 in such a manner that centerline 32 of tubular body 10 is centered in central opening 22 of collar 20.

Angle 24 is positioned across body 10 on the end opposite collar 20 and perpendicular to centerline 32 of body 10. Angle 24 is so positioned with respect to body 10 that vertical leg 26 attaches to the end of body 10 opposite to that of collar 20 and horizontal leg 28 is positioned such that flat surface 30 is parallel and planar with flat surface 12 on body 10, but with the two flat surfaces extending in perpendicular directions. That is, flat surface 12 runs parallel to centerline 32 and flat surface 30 on angle 28 extends at right angle or transverse to centerline 32 of body 10.

Central opening 22 in collar 20 is designated to be of a size for accurately sliding over wheel spindle 36. In view of the fact that wheel spindles are of various sizes it is to be anticipated that various collars 20 would have varying sized openings 22 to conform with the size of wheel spindles 36 to accurately locate the wheel alignment tool of the instant invention on wheel spindle 36 by spindle nut 38.

Spirit level 34 is of conventional construction with an air bubble in a liquid container in order that level may be rapidly determined by reading the indicia on the spirit level. It is to be noted that spirit level 34 should have a flat bottom surface for properly locating the spirit level on flat surfaces 12 and 30.

OPERATION

The wheel alignment tool of the instant invention is utilized by positioning the front wheels of the vehicle on a swivel plate and merely removing the hub and the wheel spindle nut. This leaves, as can be seen in FIG. 2, spindle 36 in condition for collar 20 to be positioned adjacent the bearing, not shown, of the wheel and spindle nut 38 then reapplied to tightly and accurately position the wheel alignment tool on the spindle. It is necessary that the instant tool be so located as to have surfaces 12 and 30 parallel to the road surface which can be accomplished by putting spirit level 34 across surface 12 or surface 30 prior to locking the tool on spindle 36. Once tool body 10 has been attached to spindle 36 it is merely necessary to locate spirit level 34 on surface 12 to determine the camber of the vehicle wheel. The proper camber for a wheel is obtained from a chart or similar information provided by the vehicle manufacturer and it is then merely necessary to adjust the camber to insure that the reading on the spirit level 34 coincides with the camber required.

Location of spirit level 34 on flat surface 30 will permit a reading of caster by determining the degree that surface 30 is out of level and comparing that with the information provided by the vehicle manufacturer as to the proper caster for the type vehicle being checked. Once the caster and camber have been properly adjusted on the wheel, it is then merely necessary to remove spindle nut 38 and reapply it to the spindle after removal of the wheel alignment tool and reapply the wheel hub.

Thus, it is seen that the instant invention is of simple construction and permits rapid and accurate adjustment of the caster and camber of vehicle wheels. It also provides for rapid and accurate determination of the caster and camber of a vehicle wheel and, therefore, permits rapid and accurate adjustment of the caster and camber for proper alignment of the vehicle wheel.

What is claimed as new and desired to be secured by Letters Patent of the United States is:

1. A wheel alignment tool comprising of a tubular body means; collar means having a central bore attached at one end of said body means for positioning on the wheel spindle of a vehicle; said body having a flat surface running longitudinally thereof; said body means having portions removed on opposite sides thereof to form access openings for providing access to permit the wheel alignment tool to be fixedly attached to the wheel spindle by the wheel spindle nut; a transverse member rigidly attached to said body and having a flat surface parallel and planar to said longitudinal flat surface of said body means; said transverse member being perpendicular to the centerline of said tubular body means; a level element for locating on either of said surfaces, whereby the caster and camber of the wheel are determined by locating said level on the respective said surface.

* * * * *